Patented Nov. 10, 1925.

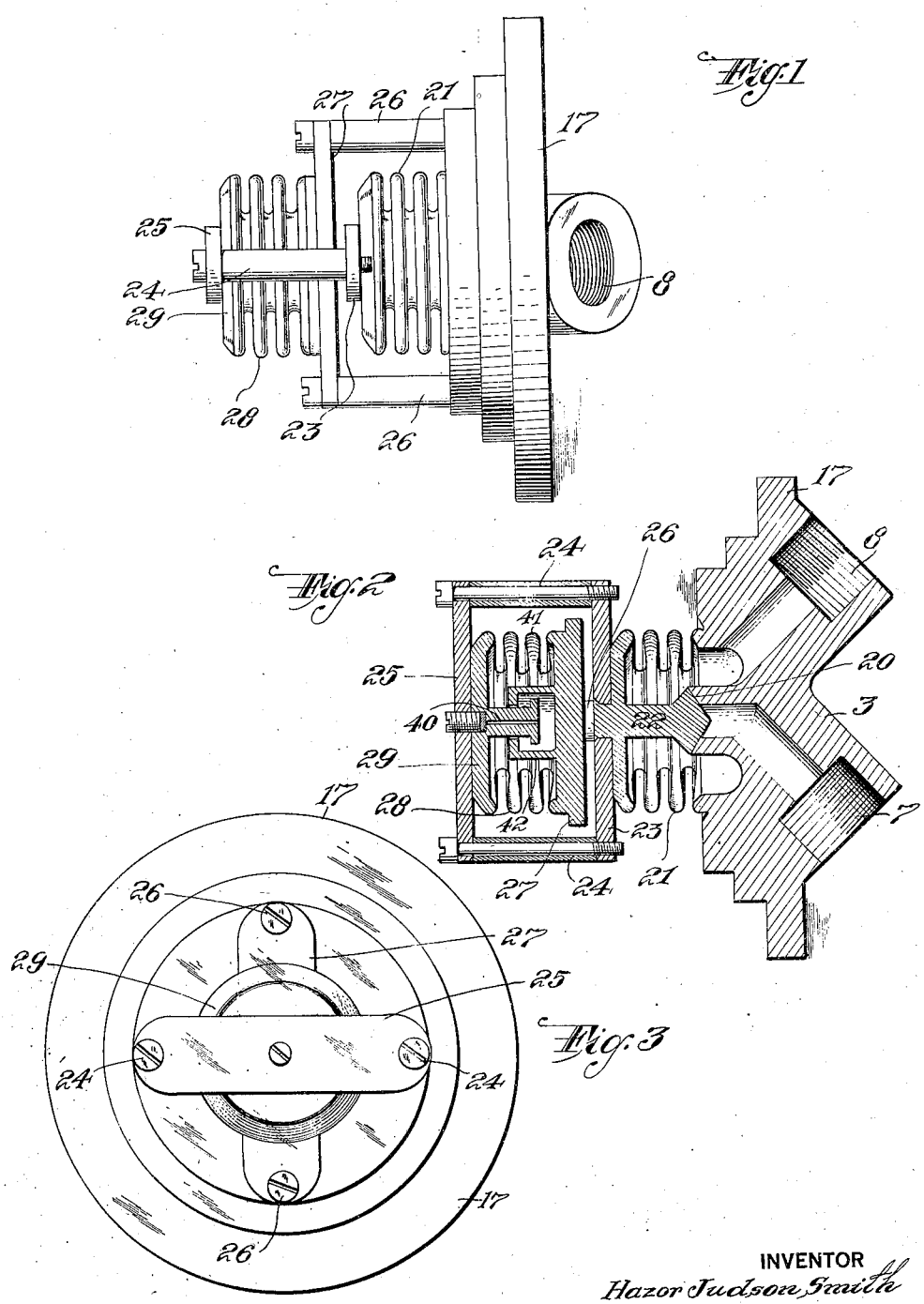

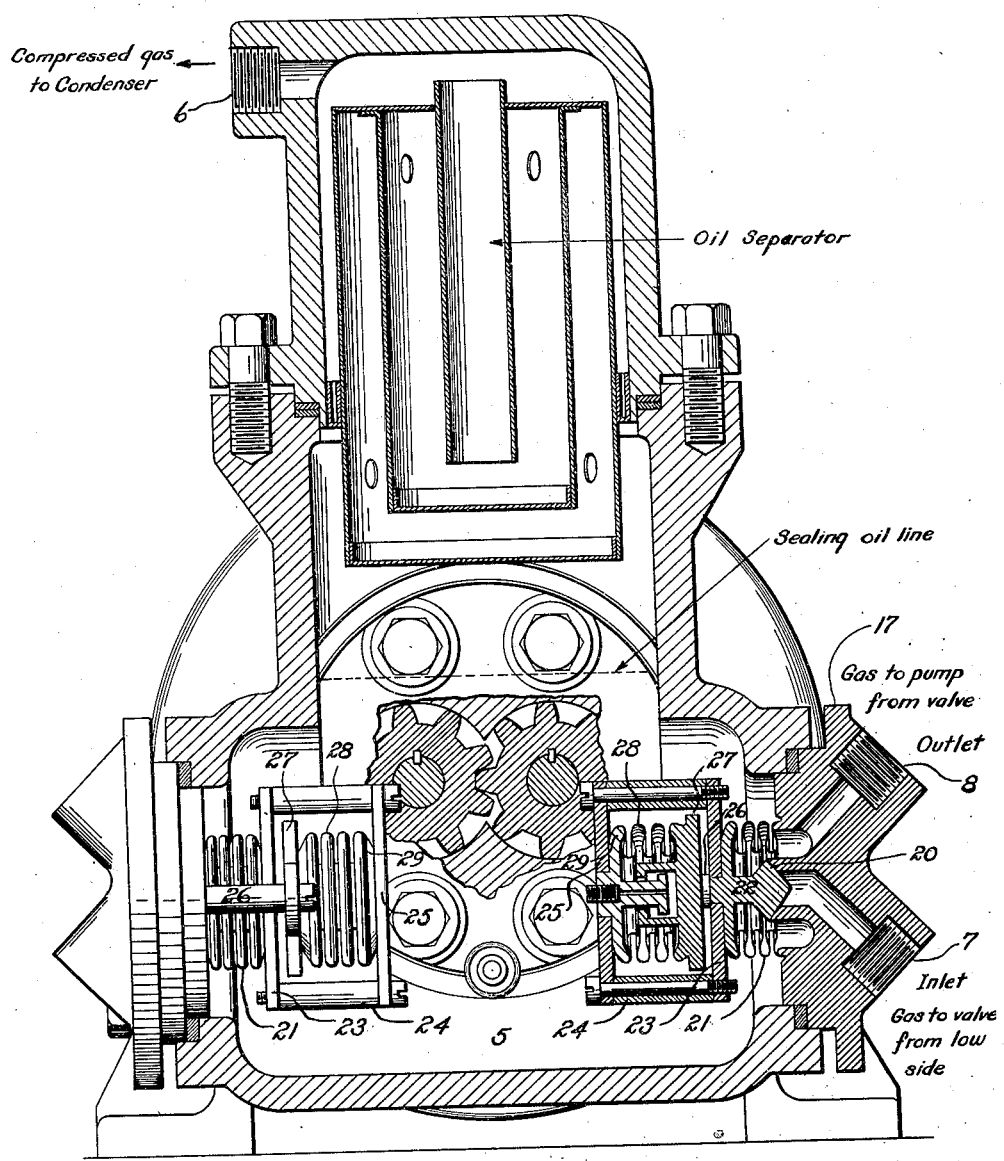

1,561,118

UNITED STATES PATENT OFFICE.

HAZOR JUDSON SMITH, OF SPRINGFIELD, MASSACHUSETTS, ASSIGNOR, BY MESNE ASSIGNMENTS, OF ONE-FOURTH TO WILLARD REID, OF SPRINGFIELD, MASSACHUSETTS; ONE-FOURTH TO ALFRED BUCKLEY, JR., OF PROVIDENCE, RHODE ISLAND; AND ONE-FOURTH TO JOHN W. SCOTT, OF PHILADELPHIA, PENNSYLVANIA.

PRESSURE TEMPERATURE VALVE.

Application filed February 5, 1921, Serial No. 442,894. Renewed March 31, 1925.

*To all whom it may concern:*

Be it known that I, HAZOR JUDSON SMITH, a citizen of the United States, residing in Springfield, Hampden County, State of Massachusetts, have invented certain new and useful Improvements in Pressure Temperature Valves, of which the following is a specification, reference being made to the accompanying drawings, forming part thereof.

This invention relates to pressure temperature valves of the sensitive element type wherein the rise in temperature surrounding the sensitive element produces a pressure within the sensitive element to open the valve; and more particularly to valves used in refrigeration machines of the private dwelling type in which the element sensitive to external pressure is charged with the refrigerating agent used in the refrigerating machine and connected in the circuit remaining closed until the temperature surrounding the sensitive element produces a pressure within the sensitive element which exceeds the pressure of the high side to a predetermined degree.

In refrigeration machines, if the conditions are all right and every part is functioning correctly, the compressor or pump will merely draw off the evaporated gas from the liquid refrigerant which has entered the low side. Numerous conditions may arise, however, which will cause a flooded low side,— the expansion element flooded with refrigerant—and the pump will draw liquid refrigerant into itself instead of vaporized gas. Under such conditions the expansion valve common to refrigeration machines will continue to feed more refrigerant and aggravate the situation. One of the objects of my invention is to provide an expansion valve which will prevent this effectively.

When liquid refrigerant enters the pump it has a tendency to congeal the oil or lubricating medium. The oil and refrigerant will emulsify and actual refrigerating effect will be in the pump instead of the expansion element. A further object is to produce a valve that will automatically close the refrigerant return line from the expansion coils to the pump whenever conditions are such that liquid refrigerant is reaching the pump in such volume or under such conditions that the pump cannot function normally and to keep this line closed until the pump, no longer receiving any refrigerant, can develop enough heat, due to friction and compression, to boil off its excess refrigerant, when it will automatically open the line and allow circulation to proceed as usual.

My pressure temperature valve is ordinarily placed within the high side and is submerged in the oil that is used to seal and lubricate the compressor and its function is to remain closed to the passage of anything through the line in which it is connected unless the temperature of its sensitive element is considerably higher than the temperature of the condenser in the high side.

The object of this invention is to produce a sensitive valve that will meet the requirements of service.

Having thus set forth my invention I will now describe an embodiment thereof. In the drawings:—

Figure 1 is a side view of my valve.

Figure 2 is a sectional view, at right angles to that shown in Figure 1.

Figure 3 is an end view thereof looking from the left.

Figure 4 is a sectional elevation through a compressor showing my valve submersed in the sealing oil.

In the carrying out of my invention I employ a face plate 17, having the passages 7 and 8 opening into the two sides of the valve seat 20. Fastened to the inner face of the plate 17 is flexible member 21 carrying the head 22 which is also the male member or valve stem of the valve 3. It will be observed that the face plate 17, flexible member 21 and the head carrying the stem 22 form an expansible body which may be affected by external pressure and throughout the specification and claims this element will be referred to as a pressure sensitive element.

Attached to the head 22 is the cross arm 23 which is in turn attached by the bolts 24 to the cross arm 25. Supported upon the plate 17 by the bolts 26 is the diaphragm head plate 27 to which is attached the flexible member 28. The head 29 closes the opposite end of the flexible member 28 and produces a sealed expansible chamber within the assembly 27, 28, and 29. The formation of the heads 27 and 29 permits of their interlocking and establishing a limit of expansion of the element 27, 28 and 29. This interlocking feature may be carried out in any manner, but for the purpose of illustration I employ attached to head 29 a stud or projection, 40, provided with a head 41. This projection and head are adapted to slide in the cylinder 42 attached to head 27. When the flexible member 28 is extended until the head 41 contacts with the head of cylinder 42 the limit of extension is reached, relieving strain on the flexible member. This element 27, 28 and 29 is charged with liquid refrigerant like that used in the ice machine to which it may be attached. This element is affected by the external temperature and is referred to by me throughout the specification and claims as an element indirectly sensitive to temperature. Its pressure for temperature curve will be identical with that of the liquid refrigerant within the high side. When the temperature surrounding the expansible chamber 27, 28 and 29 rises, the element will expand and open the valve. In the carrying out of my invention in actual use the inlet or passage 7 is connected to the line from the expansion coil in a refrigerating system and the outlet or passage 8 is connected to the inlet of the compressor. If the valve be closed the compressor cannot take gas from the expansion coils neither can it draw liquid refrigerant from a flooded low side.

The expansible units are so proportioned that when the temperature surrounding the expansible chamber 27, 28, 29, is the same as the temperature of the condenser, the back pressure of the condenser acting through the sealing oil upon the expansible body 21, 22, will be neutralized by the pressure within the expansible chamber 27, 28, 29, and the valve will be closed. With the inlet 8 shut off the temperature of the condenser will rapidly rise because of the frictional heat of the moving parts and the rapid motion of the sealing oil through the gears. As soon as the compressor and the oil within it have taken on sufficient heat to raise the temperature of the expansible chamber 27, 28, 29, to where its internal pressure is sufficient to overcome the pressure of the high side on both the head 29 and the head 22 the valve will open and because of the fact that the machine is pulling a high vacuum in the passage 8 while the valve is closed and because this high vacuum will be reduced to the working back-pressure of the machine when the valve is open, the relief of that part of the differential pressure of 22 which was represented by the high vacuum will let the valve snap open to its limit. This limit is fixed by the position of the plate 27 as related to the closed position of the valve 22. When the areas of the two heads 29 and 22 are the same the opening point of the valve occurs when the temperature of the oil is at the point where the pressure for temperature factor within the expansible chamber 27, 28, 29 is equal to twice the pressure for temperature factor in the condenser. With ethyl chloride and a condenser temperature of 80 degrees Fahr. the temperature of the oil necessary to open the valve would be approximately 108 degrees Fahr. Modification of the ratios of areas of the two heads will produce any predetermined temperature differential but we find that ethyl chloride works best when the above ratio is maintained or exceeded. In the use of ethyl chloride, sulphur dioxide, pictet fluid, methyllic ether or ammonia in a rotary gear pump the fundamental conditions leading to supercharging or emulsification are quite similar and the method we have perfected and the valve here shown are nearly indispensible to a reliable machine.

It will be observed that the expansible chamber 27, 28, 29 comprises a fixed wall or head 27, a movable wall or head 29, with a flexible member 28 interposed. The pressure of the liquid in this chamber increases as the temperature of the compressor increases. When the pressure in this expansible chamber increases due to temperature increase, the valve stem 22 is withdrawn from its seat. When "temperature sensitive element" or element indirectly sensitive to temperature is used throughout the specification and claims I mean the expansible chamber 27, 28, 29 which operates due to the rising temperature of the surrounding sealing oil in the compressor. When "pressure sensitive element" is used I refer specifically to expansible element comprising the valve seat structure as the body portion, the movable head carrying the valve stem 22 and the flexible member 21, because this element is affected by external pressure which closes the valve. This pressure varies with the back pressure of the condenser which operates on the valve through the sealing oil in the compressor.

In the description of the preferred embodiment of my invention I have used the expression "element sensitive to external pressure" to mean an element that is operated by the expansion of the liquid within the element due to the difference in temperature outside the element and in the case of a refrigerating machine the liquid within the element is the liquid refrigerant used in the system, but it is readily understood that my conception may be construed to include any element which expands due to temperature in the same relative proportion as the liquid refrigerant used in the compressor and condenser.

The pressure temperature valve herein described is in only one of many forms in which I desire to construct it, but any changes or modifications may be made without departing from the salient features of my invention; and I therefore intend the following claims to cover such modifications as naturally fall within the lines of invention.

I claim:—

1. A device of the character described including an expansible body having a valve and seat within the body and sensitive to external pressure, and a sealed expansible chamber sensitive to external temperature and operatively connected to said valve to actuate the valve.

2. A valve of the type described, a valve stem and seat in combination with a pressure sensitive element operating to hold the stem against the seat, an element indirectly sensitive to temperature operating against the action of the pressure sensitive element when a predetermined pressure for temperature has been attained.

3. A valve of the type described, a pressure sensitive element tending to close the valve, an element indirectly sensitive to temperature tending to open the valve, both operating independently the valve stem and seat and normally holding the stem on its seat.

4. A valve of the type described, a pressure sensitive element tending to close the valve, an element indirectly sensitive to temperature tending to open the valve, means to hold the valve in the closed position while the temperature of the temperature sensitive element does not equal or exceed a predetermined temperature for the pressure upon the pressure sensitive element and means operating independently against the action of the pressure sensitive element to hold the valve in the open position while the temperature of the temperature sensitive element equals or exceeds the predetermined temperature for the pressure upon the pressure sensitive element.

5. A valve of the type described in combination, a pressure sensitive element normally holding the valve closed, an element indirectly sensitive to temperature operatively connected to open the valve, and means whereby a temperature factor is made to act independently against the pressure factor to open the valve.

6. A device of the character described, including an expansible body having an inlet and outlet, a valve having a seat within said body and a sealed expansible chamber operatively connected to said valve to actuate the valve.

7. The device of claim 1, with means to limit the expansive movement of the sealed chamber.

8. A device of the character described, including a face plate, an expansible body, formed upon the face plate having an inlet and an outlet and a valve stem in the passage between the inlet and the outlet rigidly secured to the head of the expansible body.

9. A device of the character described including a face plate, an expansible body upon said face plate having an inlet and an outlet, said body having a movable wall, an expansible chamber having a stationary and a movable wall, said movable wall being secured to the movable wall of the expansible body.

10. The device of claim 9, the stationary wall of the chamber being secured to the body.

In testimony whereof I have signed my name to this specification.

HAZOR JUDSON SMITH.